United States Patent [19]

Izumida et al.

[11] Patent Number: 4,775,495

[45] Date of Patent: Oct. 4, 1988

[54] PROCESS FOR DISPOSING OF RADIOACTIVE LIQUID WASTE

[75] Inventors: Tatsuo Izumida, Hitachi; Tsutomu Baba, Katsuta; Akihiko Noie, Hitachi; Masaru Sonobe, Tomobe; Makoto Kikuchi, Hitachi, all of Japan

[73] Assignee: Hitachi, Ltd., Japan

[21] Appl. No.: 826,677

[22] Filed: Feb. 6, 1986

[30] Foreign Application Priority Data

Feb. 8, 1985 [JP] Japan .................................. 60-23321

[51] Int. Cl.$^4$ .......................... G21F 9/16; G21F 9/08; C01G 56/00; C01G 57/00

[52] U.S. Cl. ...................................... 252/628; 106/74; 106/77; 106/78; 210/682; 210/685; 210/683; 210/751; 252/629; 252/631; 423/2; 423/11; 423/333

[58] Field of Search ....................... 252/628, 631, 629; 501/152, 155, 12; 106/38.3, 74, 77, 76, 78, 85, 306, 89, 90, 97; 210/681, 682, 685, 683, 751, 670, 677; 423/11, 12, 15, 16, 157, 158, 181, 184, 333

[56] References Cited

U.S. PATENT DOCUMENTS

| | | | |
|---|---|---|---|
| 3,890,244 | 6/1975 | Carlin | 252/631 |
| 3,988,258 | 10/1976 | Curtiss et al. | 252/628 |
| 4,173,546 | 11/1979 | Hayes | 252/628 |
| 4,336,235 | 6/1982 | Deabriges | 423/332 |
| 4,349,386 | 9/1982 | Davidovits | 106/85 |
| 4,349,513 | 9/1982 | Ishiwata et al. | 252/631 |
| 4,461,722 | 7/1984 | Knieper et al. | 252/628 |
| 4,501,691 | 2/1985 | Tanaka et al. | 252/631 |
| 4,505,851 | 3/1985 | Funabashi et al. | 252/628 |
| 4,518,508 | 5/1985 | Conner | 252/628 |
| 4,581,162 | 4/1986 | Kawamura et al. | 252/628 |
| 4,671,897 | 6/1987 | Mori et al. | 252/628 |

FOREIGN PATENT DOCUMENTS

| | | | |
|---|---|---|---|
| 0158780 | 10/1985 | European Pat. Off. | 252/628 |
| 0171898 | 9/1984 | Japan | 252/629 |
| 0082895 | 5/1985 | Japan | 252/629 |

*Primary Examiner*—John F. Terapane
*Assistant Examiner*—Howard J. Locker
*Attorney, Agent, or Firm*—Fay, Sharpe, Beall, Fagan, Minnich & McKee

[57] ABSTRACT

The process of the present invention comprises adding an alkaline earth metal hydroxide such as barium hydroxide to a radioactive liquid waste containing sodium sulfate as the main component to convert the latter into an insoluble alkaline earth metal salt such as barium sulfate, adding silicic acid to by-product sodium hydroxide to prepare water glass and solidifying the radioactive insoluble alkaline earth metal salt with the water glass. According to this process, exudation of radioactive substances from the solid can be prevented and the solid having a high durability can be obtained at a low cost.

26 Claims, 3 Drawing Sheets

PROCESS FOR DISPOSING OF RADIOACTIVE LIQUID WASTE

BACKGROUND OF THE INVENTION

The present invention relates to a treatment and disposal of a radioactive liquid waste. More particularly, the invention relates to a process for disposing of a radioactive, concentrated liquid waste containing sodium sulfate as the main component which is formed in atomic power plants, etc.

It is indispensable to reduce the volume of radioactive wastes formed in an atomic power plant and to solidify the same not only for securing a storage space in that plant but also for the retrievable storage which is one of the final disposal methods.

Processes which have been proposed for reducing the volume of the radioactive waste include one wherein a concentrated liquid waste containing $Na_2SO_4$ as the main component formed in a BWR plant is dried and pulverized to remove water accounting for a major part of the radioactive waste and the obtained powder is pelletized. It has been confirmed that, according to this process, the volume of the final solid can be reduced to about $\frac{1}{8}$ of that obtained in a conventional process wherein the liquid waste is solidified directly with cement. However, even this process having a great volume-reduction effect has a defect that no stable solid can be prepared with a hydraulic solidifier such as cement, since pellets mainly comprising $Na_2SO_4$ are swollen by absorbing water from the solidifier to break the solidified body. To overcome the defect of this process, a process has been proposed wherein an alkali silicate solution is used as the solidifier in combination with a water absorbent to form stable pellets (see U.S. Pat. No. 4,505,851). Though stable, solidified pellets can be prepared by this process, it encounters another problem in the pelletization of dry powder. Under these circumstances, it has been demanded to develop a process wherein the dry powder as it is can be mixed homogeneously with the solidifier.

In typical processes for the homogeneous solidification, plastic, asphalt or inorganic material is used as the solidifier. The process wherein plastic or asphalt is used has been developed mainly for the purpose of sea disposal. However, a high cost is required of the plastic and the asphalt has a problem of an insufficient heat resistance.

SUMMARY OF THE INVENTION

An object of the present invention is to prevent the exudation of sodium sulfate from a package prepared by solidifying a radioactive liquid waste containing sodium sulfate with an inorganic solidifier.

Another object of the invention is to prepare a waste package having a high durability at a low cost.

Still another object of the invention is to effectively dispose of a radioactive liquid waste containing sodium sulfate as the main component.

The above-mentioned objects can be attained by the process of the present invention which comprises adding an alkaline earth metal hydroxide to a radioactive liquid waste containing sodium sulfate to convert the latter into an insoluble alkaline earth metal salt thereof and adding a silicon oxide compound to sodium hydroxide as the by-product to form water glass (sodium silicate).

Another feature of the process of the present invention comprises adding an alkaline earth metal hydroxide to a radioactive liquid waste containing sodium sulfate to form an insolubilized solid component, separating and solidifying this component with a solidifier, and adding a silicon oxide compound to the remaining aqueous solution of sodium hydroxide thus formed to form water glass.

Still another feature of the process of the present invention comprises adding an alkaline earth metal hydroxide to a radioactive liquid waste containing sodium sulfate to form a liquid mixture of an insolubilized solid component and an aqueous sodium hydroxide solution, adding a silicon oxide compound to the liquid mixture to form water glass and adding a hardening agent to a mixture of the water glass and the insolubilized solid component to obtain a waste package.

Other characteristic feastures, objects and advantages of the present invention will be apparent from the following description made with reference to accompanying drawings.

DESCRIPTION OF PREFERRED EMBODIMENTS

Figure 1:
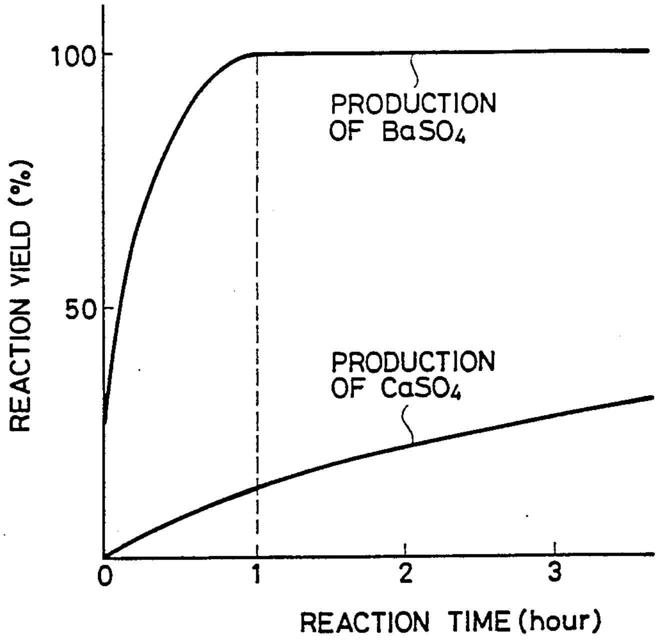
FIG. 1 is a diagram showing changes in the conversion of sulfates formed by reacting barium hydroxide or calcium hydroxide with sodium sulfate with time.

In the ground disposal of a radioactive waste, it is preferred to use a solidifier having a high conformity with soil and rocks. A solidification process wherein cement or sodium silicate (water glass) is used as the solidifier has been proposed. In the solidification, these solidifiers are mixed with a suitable amount of water and powdered waste. However, when the powdered waste is chemically reactive with the solidifier, the solidifier exerts a significant influence on the waste package thus formed, since the contact surface area between the powdered waste and the solidifier and water is large. Further, if the powdered waste is soluble in water, it is dissolved in water penetrated therein through pores of the waste package and, therefore, the waste containing radioactive nuclides exudes. This problem is serious when a dry powder mainly comprising $Na_2SO_4$ prepared from a concentrated BWR liquid waste is solidified. For example, when sodium sulfate ($Na_2SO_4$) powder is solidified with cement, calcium aluminate ($3CaO\cdot Al_2O_3$) and calcium hydroxide [$Ca(OH)_2$] in the cement react with sodium sulfate ($Na_2SO_4$) to form ettringite according to the following formula (1) to increase the volume and, as a result, to break the waste package:

$$3CaO.Al_2O_3 + 3Ca(OH)_2 + 3Na_2SO_4 + 32H_2O \longrightarrow 3CaO.Al_2O_3.3CaSO_4.32H_2O + 6NaOH \quad (1)$$

(ettringite)

Though the reaction of the above formula (1) does not occur and the problem of the increase of the volume can be solved when sodium silicate (water glass) is used as the solidifier, it is quite difficult to prevent exudation of soluble sodium sulfate from the waste package and, therefore, the leakage of radioactive nuclides (such as $^{60}Co$ and $^{134}Cs$) cannot be controlled easily.

To solve the above-mentioned problems, it is necessary to make sodium sulfate water-insoluble. For this purpose, a process wherein the surface of sodium sulfate is coated with a resin has been proposed (see Preprints for Hosha-sei Haikibutsu Forum, 1984). However, this process has defects that an additional device is necessitated for stirring a mixture of sodium sulfate and the resin at a high speed and that the volume of the waste is increased.

Though a technique of insolubilizing boric acid or sodium borate has been proposed (see the specifications of Japanese Patent Laid-Open Nos. 186099/1983 and 12399/1984), this process cannot be employed in the treatment of sodium sulfate. This process comprises adding barium hydroxide, calcium hydroxide or the like to a concentrated liquid waste containing boric acid or sodium borate to obtain a slurry having a high viscosity and solidifying the slurry with cement. However, when a concentrated liquid waste containing sodium sulfate as the main component is treated by this process, no slurry having a high viscosity can be obtained but an alkaline aqueous solution containing precipitates suspended therein is obtained, and this solution cannot be solidified directly with cement, since cracks are formed in the formed solidified body by the alkali component in the alkaline aqueous solution.

Under these circumstances, development of a convenient process for solidifying a concentrated liquid waste particularly, concentrated BWR liquid waste containing sodium sulfate as the main component to form a solidified body having a high durability at a low cost has eagerly been demanded.

The present invention has been completed on the basis of an idea that sodium sulfate contained in the radioactive, concentrated liquid waste as the main component is converted into an insoluble alkaline earth metal salt by reacting it with an alkaline earth metal hydroxide and sodium hydroxide formed as the by-product is reacted with silicic acid to form sodium silicate (water glass).

Sodium sulfate contained in the radioactive, concentrated liquid waste as the main component is rapidly soluble in water because of its high water solubility (about 20 wt. % at 25° C.) and an extremely high deliquescent property. Therefore, when sodium sulfate is mixed with a hydraulic solidifier such as cement or water glass, it is dissolved in water or deliquesces and, even after the solidification, it is extremely highly soluble in water. When the waste package is immersed in water, water penetrates therein through micropores in the body to dissolve and exude sodium sulfate rapidly. Occasionally, the waste package per se is disintegrated by a peeling phenomenon.

On the contrary, alkaline earth metal sulfates such as calcium, barium or strontium sulfate have a solubility in water of as low as up to 1 wt. %.

The inventors have noted this fact. When an alkaline earth metal ion is added to a concentrated liquid waste, sodium sulfate is chemically converted into an alkaline earth metal sulfate to form an insoluble precipitate according to the following formula (2):

$$Na_2SO_4 + M^{++} \longrightarrow MSO_4 + 2Na^+ \quad (2)$$

M: an alkaline earth metal.

Though the alkaline earth metal ion may be used also in the form of its salt such as chloride or nitrate, the alkaline earth metal hydroxide is used preferably, since when the salt is used, a soluble sodium salt might be formed from $Na^+$ formed according to the above formula (2) in addition to the intended alkaline earth metal salt and this is undesirable from the viewpoint of the volume reduction. When an alkaline earth metal hydroxide is used, sodium hydroxide is formed in addition to the insoluble salt as shown in the following formula (3):

$$Na_2SO_4+M(OH)_2 \rightarrow MSO_4+2NaOH \ldots \quad (3)$$

Sodium hydroxide thus formed is usable as a starting material for water glass used as the solidifier as will be described below and, in addition, this technique is preferred from the viewpoint of the volume reduction.

FIG. 1 shows efficiencies of insolubilization reactions according to the above formula (3) obtained when barium hydroxide and calcium hydroxide are added to a concentrated liquid waste. It is apparent from FIG. 1 that when barium hydroxide is used, an efficiency of 100% can be obtained in 1 h at 80° C. When calcium hydroxide is used, a longer reaction time is necessitated, since the efficiency is lowered to only a fraction of that of barium hydroxide and, therefore, a higher cost than that required of barium hydroxide is necessitated. Thus, barium hydroxide is preferred to calcium hydroxide. The order to preference is: barium>calcium>strontium>magnesium. Though the alkaline earth metal hydroxide may be used in the form of either powder or solution, powder is preferred from the viewpoint of saving the capacity of the reactor. When powder is used, water is necessitated at least in such an amount that the powder is dissolved therein, since the reaction takes place after the powder is dissolved in water to form the alkaline earth metal ion. No problem is posed in this point, since the concentrated liquid waste has a concentration of about 20 wt. %.

When barium hydroxide is added to the concentrated liquid waste, insoluble barium sulfate is formed. At the same time, the waste becomes turbid because of the presence of barium sulfate particles suspended therein. The liquid waste is not viscous and easily filterable. The filter cake comprises a mixture of barium sulfate formed by the insolubilization reaction and radioactive crud formed in the atomic power plant. The solid may be disposed after solidifying with any solidifier such as cement, water glass or plastic.

On the other hand, the filtrate comprises an aqueous soidum hydroxide solution. Though this solution may be recovered, if necessary, as it is, it is reacted with silicic acid according to the present invention to form sodium silicate (water glass) to be used as the solidifer according to the following formula (4):

$$2NaOH + nH_2SiO_3 \longrightarrow Na_2O.nSiO_2 + (n+1)H_2O \quad (4)$$

silicic acid water glass

In this step, powdered silicic acid is added to the aqueous sodium hydroxide solution and the mixture is stirred to form white silicic acid particles suspended therein in a collidal state. As the reaction proceeds, the amount of the particles is reduced and the solution turns gradually into a transparent, viscous liquid, i.e. water glass. Water is evaporated off suitably from the water glass which may be recovered for use as a starting material for the solidifer to form a firm waste package by adding a hardening agent such as silicon phosphate.

Thus, the radioactive liquid waste can be disposed effectively by adding an alkaline earth metal hydroxide to the radioactive liquid waste containing sodium sulfate to form an insolubilized precipitate, separating the precipitate, solidifying the separated precipitate with a solidifier, adding a silicon oxide compound to the remaining aqueous sodium hydroxide solution to form water glass and recovering the water glass.

In another embodiment, the water glass production process may be connected with the sodium sulfate insolubilization process. More particularly, the alkaline earth metal hydroxide is added to the radioactive liquid waste containing sodium sulfate to convert the latter into an insolubilized solid, then the silicon oxide compound is added to a liquid mixture of the solid and the formed aqueous sodium hydroxide solution to form water glass and the hardening agent is added thereto to solidify the whole mixture. Examples of the hardening agents include those comprising silicon polyphosphate as the main component and a small amount of cement. The solidification of the whole mixture with the formed water glass may be effected by concentrating the liquid mixture of the insolubilized solid and the formed water glass and then solidifying the same when the hardening agent or by completely drying and pulverizing the mixture with a centrifugal thin film dryer or the like and then adding the hardening agent and water thereto to form a solidified body. The dry powder may be pelletized prior to the addition of water and the hardening agent.

The higher the temperature, the higher the rates of the insolubilization reaction and water glass forming reaction. However, from the viewpoints of the practical procedure and the cost, a temperature in the range of about 40° to 80° C. is preferred. According to our experiments, the reactions were completed in about 1 h at a temperature in said range without posing any problem.

As described above, the process of the present invention has been developed on the basis of experimental results that soluble sodium sulfate can be converted easily into an insoluble salt with an alkaline earth metal hydroxide and by-product sodium hydroxide can be used as the starting material for water glass used as the solidifier. According to the process of the present invention, a waste package having a high water resistance can be prepared at a low cost.

The process of the present invention will be illustrated with reference to the accompanying drawings.

Figure 2:
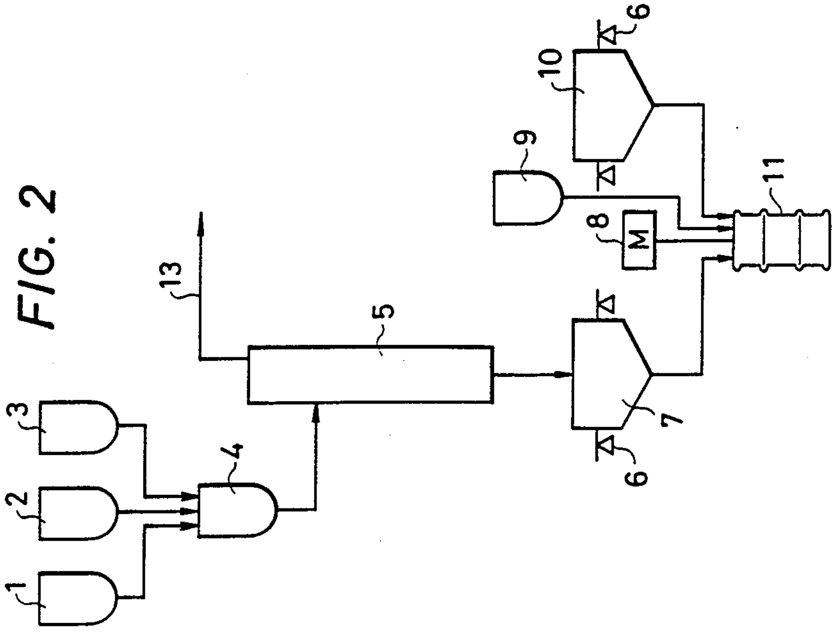
FIG. 2 is a schematic drawing of a system employed in an embodiment of the present invention.

FIG. 2 shows a system of an embodiment of the present invention. In FIG. 2, a concentrated liquid waste is fed from a concentrated liquid waste tank 1 into a mixing reaction tank 4. Barium hydroxide is also fed therein from a barium hydroxide tank 2. A liquid mixture of the concentrated liquid waste and barium hydroxide in the tank 4 is stirred at a temperature kept at 40° to 80° C. for about 1 h to carry out the reaction and to insolubilize sodium sulfate. Then, silicic acid is fed into the tank 4 from a silicic acid tank 3 and the mixture is stirred at 80° C. for 1 h to carry out water glass forming reaction. After completion of the reaction, the waste solution is introduced into an evaporative concentrator 5 and concentrated by evaporation therein while vapor 13 is discharged therefrom. The concentrated solution is introduced into a concentrated solution storage tank 7. The concentrated solution is measured with a load cell 6 and then poured into a drum 11. At the same time, a hardening agent is poured therein from a hardening agent tank 10 and the mixture is kneaded with a stirrer 8 while water is poured therein suitably from a water tank 9 to control the viscosity of the mixture. After thorough kneading, the mixture is solidified.

Figure 3:
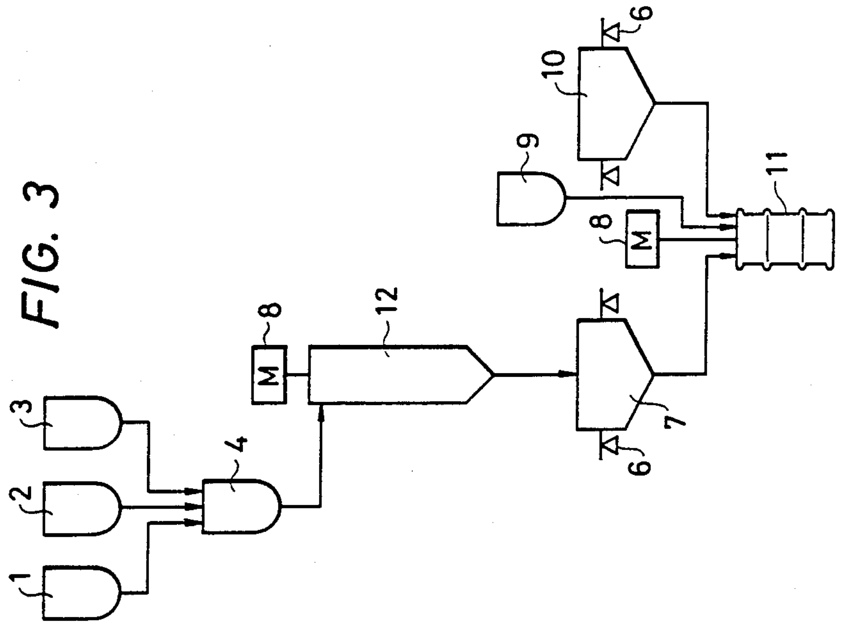
FIG. 3 is a schematic drawing of the same system as shown in FIG. 2 except that an evaporative concentrator is replaced with a drying pulverizer.

The reaction liquid formed in the mixing reaction tank 4 may be completely dried and pulverized prior to the solidification. When the waste is stored intermediately in the form of compression-molded products such as pellets, the above-mentioned process wherein the liquid is not directly solidified but dried and powdered prior to the solidification is highly effective. When it is intended to increase the treatment rate in the drying and pulverization step, a drying pulverizer 12 which has been developed and used practically already may be replaced with the same evaporative concentrator 5 as in FIG. 2 as shown in FIG. 3. By this replacement, the treatment rate is increased 5-folds.

Figure 4:
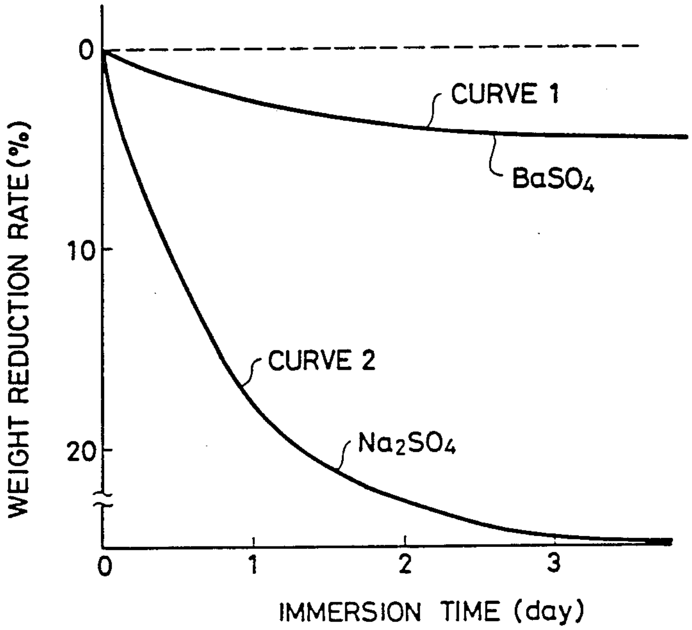
FIG. 4 is a diagram showing a relationship between the weight reduction rate of a solidified body and the period (days) of immersion of water, wherein sodium sulfate is used as it is or after conversion into barsium sulfate.

FIG. 4 shows a weight reduction rate of the waste pack age prepared by the above-mentioned process comprising the insolubilization and water glass preparation steps observed when it is immersed in water (curve 1) as compared with that of a product obtained by solidifying the dry powder obtained from the concentrated waste liquor without the insolubilization step (curve 2). The packing rate of the waste was set at 50 wt. % in both cases. The solidified body prepared by the process of the present invention was saturated with a reduction rate of around 5% and no more reduction was observed. The 5% reduction was due to exudation of a soluble salt formed by the reaction with the hardening agent in the step of hardening of the water glass. This exerts no influence on the durability of the solidified body or exudation of radioactive isotopes.

Figure 5:
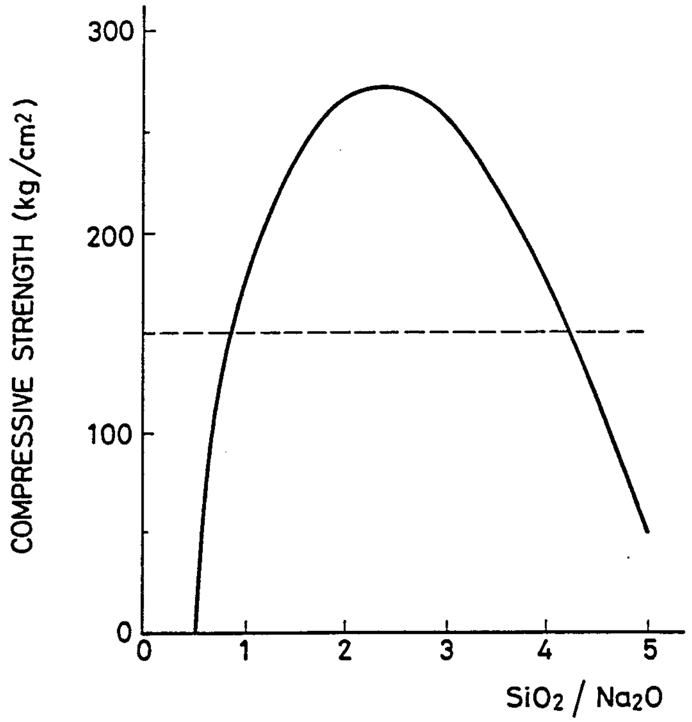
FIG. 5 is a diagram showing a relationship between the compressive strength of a waste package and the ratio of silicon oxide to sodium oxide in the water glass.

FIG. 5 shows the compressive strength of the solidified body obtained as above. It is apparent that it has a sufficient capacity, the maximum strength being 270 $kg/cm^2$. It will be understood that the compressive strength depends significantly on the ratio of $SiO_2$ to $Na_2O$, i.e. the composition of the water glass. In this embodiment, the composition of the water glass represented by the chemical formula: $Na_2O \cdot nSiO_2$ can be controlled suitably, since it also is prepared in the apparatus used in the process of the present invention. The intended composition of the water glass can be obtained easily by controlling the amount of silicic acid added to sodium hydroxide formed as the by-product in the insolubilization step. In FIG. 5, the ratio of $SiO_2$ to $Na_2O$ for obtaining the compressive strength of at least 150 $kg/cm^2$ (i.e. the standard in the sea disposal of wastes) is in the range of 1 to 4. It is thus preferred to prepare water glass having an $SiO_2/Na_2O$ ratio in this range.

Figure 6:
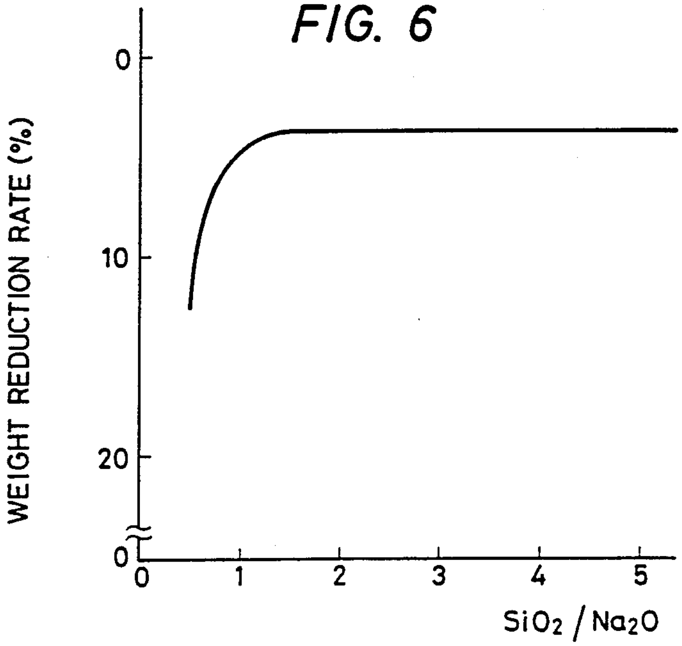
FIG. 6 is a diagram showing a relationship between the weight reduction rate of a waste package and the ratio of silicon oxide to sodium oxide in water glass.

FIG. 6 shows changes in the water resistance of the solidified body with the $SiO_2/Na_2O$ ratio determined by immersion in water. The larger the relative amount of $SiO_2$, the higher the water resistance. The water resistance becomes constant with an $SiO_2/Na_2O$ ratio of higher than 1, since the water resistance is reduced as the amount of $Na_2O$ which forms the soluble salt is increased, while $SiO_2$ constituting the main skeleton of the solidified body is essentially insoluble. With reference to the optimum range of the uniaxial compression strength shown in FIG. 5, it will be apparent that the optimum $SiO_2/Na_2O$ ratio is 1 to 4.

According to the process of the present invention, the water resistance of the solidified body can be improved remarkably, since sodium sulfate contained in the radioactive concentrated waste liquor as the main component can be converted into an insoluble alkaline earth metal sulfate. More particularly, the weight reduction rate can be reduced from 30% to 5% and, therefore, exudation of radioactive nuclides from the solidified body can be reduced remarkably and the durability of the solidified body can be improved.

Further, the preparation cost of the solidified body is reduced to about ¼ of that of the conventional processes, since water glass is also prepared in the process of the present invention.

What is claimed is:

1. A process for disposing of a radioactive liquid waste, which comprises adding an alkaline earth metal hydroxide to a radioactive liquid waste containing sodium sulfate to convert said sodium sulfate into an insoluble alkaline earth metal salt thereof with the formation of sodium hydroxide as a by-product, adding a silicon oxide compound to the sodium hydroxide by-product to form water glass (sodium silicate), and solidifying said insoluble alkaline earth metal salt using said water glass.

2. A process for disposing of a radioactive liquid waste according to claim 1, wherein the radioactive liquid waste contains sodium sulfate as the main component.

3. A process for disposing of a radioactive liquid waste according to claim 2, wherein the alkaline earth metal hydroxide is barium hydroxide.

4. A process for disposing of a radioactive liquid waste, which comprises adding an alkaline earth metal hydroxide to a radioactive liquid waste containing sodium sulfate to form an insolubilized solid component and a remaining aqueous solution component containing sodium hydroxide, separating said insolubilized solid component from the aqueous solution component containing sodium hydroxide, adding a silicon oxide compound to the remaining aqueous solution of sodium hydroxide to form water glass, and solidifying said insolubilized solid component with a solidifier including said water glass.

5. A process for disposing of a radioactive liquid waste according to claim 4, wherein a mixture of the radioactive liquid waste and the alkaline earth metal hydroxide is kept at 40° to 80° C. and stirred to insolubilize the sodium sulfate.

6. A process for disposing of a radioactive liquid waste according to claim 5, wherein the mixture of the formed aqueous sodium hydroxide solution and the silicon oxide compound added thereto is stirred at a temperature of about 80° C. to form water glass.

7. A process for disposing of a radioactive liquid waste according to claim 4, wherein the alkaline earth metal hydroxide is barium hydroxide.

8. A process for disposing of a radioactive liquid waste according to claim 4, wherein the radioactive liquid waste contains sodium sulfate as the main component.

9. A process for disposing of a radioactive liquid waste, which comprises the steps of adding an alkaline earth metal hydroxide to a radioactive liquid waste containing sodium sulfate to form a mixture of an insolubilized solid component and an aqueous sodium hydroxide solution; adding a silicon oxide compound to the liquid mixture while stirring the liquid mixture to form water glass mixed with the insolubilized solid compound; evaporating water contained in the liquid mixture comprising the insolubilized solid component and the water glass thus formed thereby to concentrate the liquid mixture; and adding a hardening agent to the concentrated liquid mixture to obtain a waste package.

10. A process for disposing of a radioactive liquid waste according to claim 9, wherein the radioactive liquid waste contains sodium sulfate as the main component.

11. A process for disposing of a radioactive liquid waste according to claim 10 wherein the alkaline earth metal hydroxide is barium hydroxide.

12. A process for disposing of a radioactive liquid waste according to claim 11, wherein the mixture of the radioactive liquid waste and the alkaline earth metal hydroxide is stirred at a temperature in the range of 40° to 80° C. to insolubilize the sodium sulfate.

13. A process for disposing of a radioactive liquid waste according to claim 12, wherein a silicon oxide compound is added to the formed aqueous sodium hydroxide solution and the mixture is stirred at a temperature kept at about 80° C. to form water glass.

14. A process for disposing of a radioactive liquid waste according to claim 9, wherein the mixture comprising the formed water glass and the insolubilized solid component is dried and pulverized and then water and a hardening agent are added thereto to obtain the waste package.

15. A process for disposing of a radioactive liquid waste according to claim 9, wherein the ratio of silicon oxide ($SiO_2$) to sodium oxide ($Na_2O$) in the water glass is in the range of 1 to 4.

16. A process for disposing of a radioactive liquid waste according to claim 15, wherein the ratio of silicon oxide to sodium oxide in the water glass is in the range of 2 to 3.

17. In a process for treating a radioactive liquid waste containing sodium sulfate for disposal comprising adding a silicon oxide compound to the radioactive liquid waste containing sodium sulfate to form water glass, and adding a hardening agent to said water glass to form a solidified body, the improvement which comprises: (1) adding an alkaline earth metal hydroxide to the radioactive liquid waste containing sodium sulfate to form an insoluble alkaline earth metal salt and an aqueous sodium hydroxide solution, (2) adding a silicon oxide compound to the resultant sodium hydroxide solution to form an insoluble alkaline earth metal salt-water glass mixture, and (3) adding a hardening agent to said mixture to form a solidified body.

18. A process for disposing of a radioactive liquid waste according to claim 17, wherein the mixture comprising the formed water glass and the insolubilized solid component is dried, pulverized and pelletized and then water and a hardening agent are added thereto to obtain the waste package.

19. A process for treating a radioactive liquid waste containing sodium sulfate for disposal according to claim 17 wherein the radioactive liquid waste contains sodium sulfate as the main compound.

20. A process for treating a radioactive liquid waste containing sodium sulfate for disposal according to claim 17, wherein the alkaline earth metal hydroxide is barium hydroxide.

21. A process for treating a radioactive liquid waste containing sodium sulfate for disposal according to claim 17, wherein the mixture of the radioactive liquid waste and the alkaline earth metal hydroxide is stirred at a temperature in the range of 40° to 80° C. to insolubilize the sodium sulfate.

22. A process for treating a radioactive liquid waste containing sodium sulfate for disposal according to claim 17, wherein the mixture comprising the formed water glass and the insolubulized solid component is concentrated.

23. A process for treating a radioactive liquid waste containing sodium sulfate for disposal according to claim 17, wherein the mixture comprising the formed water glass and the insolubulized solid compound is dried, pulverized, and rewetted.

24. A process for treating a radioactive liquid waste containing sodium sulfate for disposal according to claim 17, wherein the ratio of silicon oxide ($SiO_2$) to sodium oxide ($Na_2O$) in the water glass is in the range of 1 to 4.

25. A process for treating a radioactive liquid waste containing sodium sulfate for disposal according to claim 17, wherein the ratio of silicon oxide ($SiO_2$) to sodium oxide ($Na_2O$) in the water glass is in the range of 2 to 3.

26. A process for disposing of radioactive liquid waste, which comprises the steps of:

adding barium hydroxide to a radioactive liquid waste containing sodium sulfate as the main component and stirring the liquid waste and the barium hydroxide added thereto to form a mixture of an insolubilized solid component of barium sulfate and an aqueous sodium hydroxide solution;

adding a silicon oxide compound to the mixture while stirring the mixture to form water glass mixed with the insolubilized solid compound, whereby the mixture is free of the sodium hydroxide;

evaporating water contained in the mixture of the insolubilized solid component and the water glass thus formed thereby to concentrate the liquid mixture; and, adding a hardening agent to the concentrated mixture while stirring the mixture and adding water to obtain a waste package.

* * * * *